United States Patent

Plint et al.

[11] Patent Number: 5,991,527
[45] Date of Patent: Nov. 23, 1999

[54] SYSTEM FOR SIMULATING A PRODUCTION ENVIRONMENT

[75] Inventors: Adrian George Plint, Newbury; Dean Gardiner, Winchester; Amir Davidov, Hendon, all of United Kingdom

[73] Assignee: Plint & Partners, Ltd., Berkshire, United Kingdom

[21] Appl. No.: 08/959,940

[22] Filed: Oct. 29, 1997

[30] Foreign Application Priority Data

Nov. 11, 1996 [GB] United Kingdom .................. 9622843

[51] Int. Cl.$^6$ .......................... G05B 19/418; G06F 9/455
[52] U.S. Cl. ........................................................ 395/500.27
[58] Field of Search .................... 364/578, 468; 395/500, 500.27

[56] References Cited

U.S. PATENT DOCUMENTS

| | | | |
|---|---|---|---|
| 5,115,888 | 5/1992 | Schneider | 186/61 |
| 5,278,750 | 1/1994 | Kaneko et al. | 364/401 |
| 5,751,580 | 5/1998 | Chi | 364/468.07 |
| 5,850,345 | 12/1998 | Son | 364/578 |

FOREIGN PATENT DOCUMENTS

| | | | |
|---|---|---|---|
| 1419064 | 12/1975 | United Kingdom | G09B 19/00 |
| 1542910 | 3/1979 | United Kingdom | G09B 9/00 |

Primary Examiner—Kevin J. Teska
Assistant Examiner—Lonnie A. Knox
Attorney, Agent, or Firm—Holland & Hart llp

[57] ABSTRACT

A system for simulating a production environment in which a plurality of components are subject to a plurality of different processes to generate an end product. The system comprises a plurality of modules, each module representing one of said processes and a set of data carriers, representing said components. Each module comprises read circuitry for reading data from a data carrier and means for providing an indication representing whether an attempted transaction of the module is valid or invalid. The validity or invalidity of the transaction is based on a predetermined job route which defines a valid predetermined sequence and timing of processes for each component or set of components. Each data carrier carries a unique identification which can be read by the read circuitry and which represents a component or a set of components.

15 Claims, 5 Drawing Sheets

| IDENTIFICATION NUMBER | COMPONENT | SUPPLIER | LAST MODULE | STATUS | CONDITION |
|---|---|---|---|---|---|
| 10120 | T | P | 208 | LOCKED | OK |
| 10311 | T | P | 206 | FREE | OK |
| 12321 | S | J | 202 | FREE | FAILED |

FIG. 4a
PARTS LIST

| MODULE CODE | PROCESS TIME (MINS) | TRANSIT TIME (MINS) |
|---|---|---|
| 204 | 10 | 1 |
| 206 | 20 | 5 |
| 208 | 15 | 3 |
| 210 | 7 | 2 |
| 212 | 5 | 1 |
| 214 | 3 | 7 |

FIG. 4b
JOB ROUTE FOR COMPONENT T

| SUPPLIER CODE | COMPONENT SUPPLIED | ON TIME COEF | QUALITY COEF | PRICE £ |
|---|---|---|---|---|
| P | T | 0.7 | 0.9 | 70 |
| P | S | 0.7 | 0.6 | 60 |
| J | S | 0.2 | 0.3 | 30 |

FIG. 4c
SUPPLIER LIST

| MACHINE CODE | OPERATOR TRAINING | OPERATOR MORAL | LAST BREAK TIME |
|---|---|---|---|
| 204 | 0.9 | 0.7 | 13.20 |
| 206 | 0.4 | 0.6 | 09.03 |

FIG. 4d
EMPLOYEE LIST

| MACHINE CODE | MTBF HRS | LAST SERVICE | CONDITION |
|---|---|---|---|
| 204 | 100 | 31/2/96 | FAILED |
| 206 | 2000 | 12/1/93 | OK |

FIG. 4e
MACINERY LIST

SYSTEM FOR SIMULATING A PRODUCTION ENVIRONMENT

BACKGROUND OF THE INVENTION

1. Field of the Invention

The present invention relates to a system for simulating a production environment, and in particular an environment in which a process flow can be divided into a number of distinct process steps.

2. Descriptioon of the Problem Solved

Managing the operation of a production unit or environment effectively is a skillful and stressful enterprise. Strategic and tactical decisions must be made on a frequent basis and the consequences of such decisions may have an unseen and decisive impact on the operation of the production unit. It would be useful if a manager could simulate the operation of his production unit so that the effect of a decision on the unit as a whole could be foreseen in simulation before the decision is made in real life. Systems intended to provide such a simulation are known, but they invariably involve a computer having dedicated software which has been specially designed to simulate a particular process and can be extremely complex and expensive. Such machines may be a justifiable expense in the petrochemical or pharmaceutical industries but are prohibitively expensive for small-scale manufacturing industries. Moreover, it is not normally possible to make even simple changes to the software without going through a long, involved process.

It would therefore be desirable to provide a system which is less complex and more flexible and which in particular can be easily adapted to simulate different process flows. Such a system would potentially have wide applications throughout industry and could bring the possibility of process simulation within the means of small companies.

SUMMARY OF THE INVENTION

According to the present invention there is provided a system for simulating a production environment in which a plurality of different components are subject to a plurality of different processes to generate an end product, the system comprising:

- a plurality of modules, each module representing one of said processes and comprising read circuitry for reading data from a data carrier and means for providing an indication representing whether an attempted transaction of the module is valid or invalid based on a predetermined job route which defines a valid predetermined sequence and timing of processes for each component or set of components; and
- a set of such data carriers representing said components and each carrying a unique identification which can be read by the read circuitry and which represents a component or a set of components.

Modules can have local intelligence to establish valid or invalid transactions on the basis of the job route which can be held at a database distributed across the modules. In this event, the modules must be electrically connected so that they can communicate.

Alternatively the system comprises a controller which is connected to the modules, which can then be relatively "dumb" because the validity of attempted transactions can be determined at the controller. The job route can then be held in a memory local to the controller.

Each module can have its own timer for monitoring the predetermined period associated with the process it is representing. Alternatively, the modules can communicate with the controller in real time and the controller can determine the periods in simulated time and notify the modules accordingly.

One advantage of a system according to the present invention is its flexibility. The system is not limited to the simulation of a particular process flow. Such flexibility allows the system to be used as a tool in the training of production managers. The system is particularly suitable for training managers in the taking of strategic and tactical decisions under constraints of time, money, quality of goods, etc. Trainee managers can therefore develop an awareness of the problems related to managing a variety of interdependent but individual processes and develop the skills necessary to surmount such problems, without their training compromising the profitability of a real production unit.

One feature of the present invention which makes it particularly suitable for training is the simulation of a process by a simple flexible physical model. This allows multiple users to be simultaneously actively involved in the simulation and encourages the development of interpersonal skills. It also means that extensive training is not required before a user may operate the simulation. Finally, the use of physical data carriers as representations of the component inputs to and outputs from the steps in the process allows a ready reckoning of where bottlenecks are occurring in the process.

In a real production environment, each component or set of components would be occupied for a predetermined period associated with each process. According to one aspect of the present invention therefore it is possible to allocate a locked status to the unique identification of a data carrier representing an occupied component when a valid transaction has been effected.

The system can include a database holding each said unique identification in association with the type of component it represents and its current status. That database can be held at the controller or again can be part of a distributed database amongst several "intelligent" modules.

Each module can comprise means for providing a visual indication of its status, such as idle, working or failed. This could be done on a LCD or by individual lights.

The indication of a valid/non-valid transaction can be accomplished by a display or by an audible indicator, such as a beep.

The system can comprise a gateway module connected to the communication path of each module for providing an interface between the modules and the controller.

A system clock can be provided which provides a visual indication of simulated time in which said predetermined periods are measured. The relationship between simulated time and real time can be altered so that simulated time can be slowed down, speeded up or stopped altogether depending on the requirements of the simulation.

The system can include an initiator for allocating to each module a process it is to represent.

The initiator can also allocate to each unique identification of a data carrier a component and a predetermined sequence of processes (job route) for that component type.

Preferably, the data carriers are visually distinguishable to represent different types of components. Thus, they could for example be of different colours for different component types.

In the preferred embodiment, each module comprises a magnetic card reader and each data carrier comprises a magnetic swipe card. However, many other possibilities exist for the interaction between modules and data carriers.

If each module could be arranged not only to read data from a data carrier, but also to write data to it, then it would be possible for each module to comprise a programmed microcontroller which is capable of reading the unique identification from the data carrier, and modifying or storing data onto the data carrier to indicate its status and its sequence of processes.

BRIEF DESCRIPTION OF THE DRAWINGS

For a better understanding of the present invention and to show how the same may be carried into effect reference will now be made by way of example to the accompanying drawings.

FIG. 3b illustrates the circuitry of the reading module illustrated in FIG. 3a;

FIGS. 4a to 4e illustrate various databases stored on the computer of the system illustrated in FIG. 1.

DETAILED DESCRIPTION

Figure 1A:
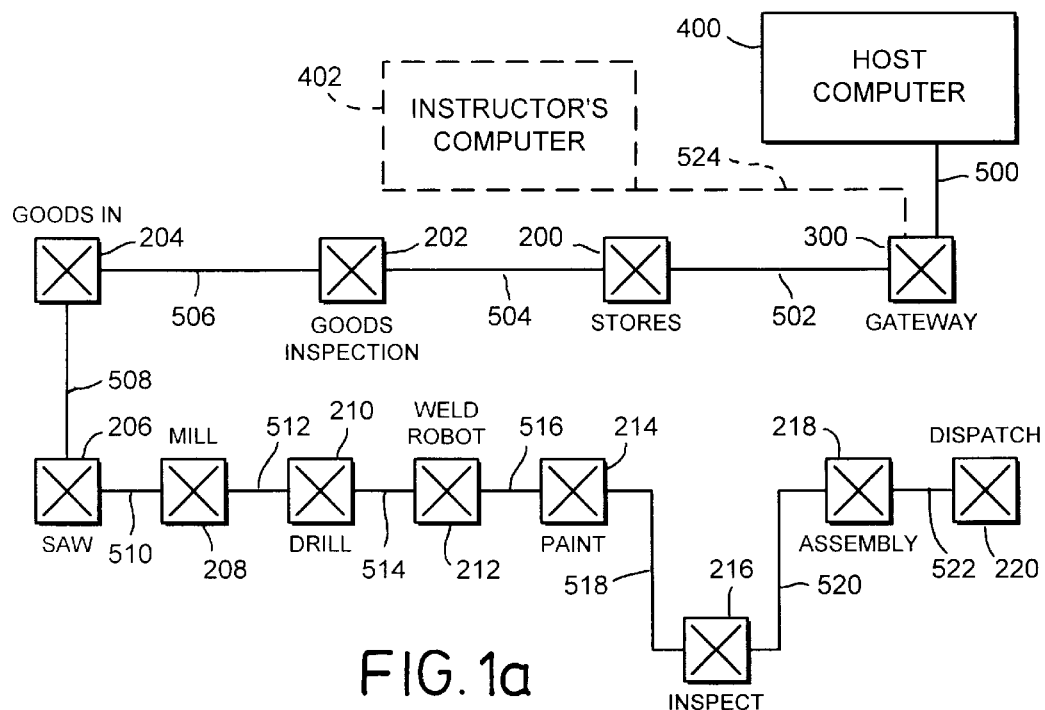
FIG. 1a illustrates the interconnected components of a system for simulating a production process, with the solid black lines indicating electrical connections.

A general concept underlying the described system is that a process flow in a production environment can be reduced to a number of distinct process steps, where each process step acts on a component. As components pass through the process steps they become inspected, modified or treated components depending on the individual process step. The process steps for each type of component have to be applied to the component in a particular sequence which is termed herein a job route. Each of the steps in the process flow is represented by a data carrier reader. The data carrier readers are all connected to a controller which controls the simulation. Data carriers are used to represent the components as they progress through the steps of the process flow. A single data carrier may therefore start as representing an untreated component at the beginning of a process flow, and after successfully passing though the reading devices representing the successive steps in the process flow the data carrier will represent a finished, properly treated output product of the process flow. An attempted transaction between a data carrier and a reader takes place when the user wishes the component represented by a particular data carrier to be subject to the process step represented by a particular data carrier reader. A valid transaction occurs when, in the simulation, the particular component represented by the data carrier can validly be subjected to the particular process step represented by the data carrier reader at that time. The controller records that the data carrier is now "locked" at that particular process step, and prevents it being part of a valid transaction with another data carrier reader until the controller has determined after a determined period has passed that the particular process step has finished and the data carrier now represents a treated component which is "unlocked". The data carrier can now enter into a valid transaction with the data carrier reader which represents the next step in the process flow. The controller determines the period for a particular process to finish in accordance with the characteristics of the process step being simulated. The determination may be influenced by strategic or tactical decisions taken by the user. The controller also determines whether or not an attempted transaction is valid based on the preassigned job route for that component.

Reference will now be made to FIGS. 1a to 5 which illustrate one particular example of how a production process for the production of bicycles may be simulated. In these figures, similar reference numerals denote similar parts.

In this example a bicycle is made from the following components: handlebars, saddle; chain, two wheels and a frame. The handlebars, saddle, chain and wheels are purchased from an external supplier and may be stored on-site, whereas the frame is manufactured on-site from lengths of metal tubing. The components of the bicycle are then assembled to create the finished product which is dispatched to the customer. The whole production process can be divided into three process flows:

a) the storage of handlebars, saddle, chain and wheels;

b) the manufacture of a frame; and c) the assembly and dispatch of a bicycle.

The simulation of process flow a)—the storage of components—consists of the process steps:

1) receipt of the separate components;

2) inspection of the components which is optional; and 3) storage.

The simulation of process flow b)—the manufacture of a frame—consists of the process steps:

1) receiving metal tubing;

2) sawing the metal tubing;

3) milling the ends of the cut tubes;

4) drilling the tubing;

5) welding the tubing together using a welding robot;

6) painting the frame; and 7) inspecting the frame, which is optional

The simulation of process flow c)—the assembly and dispatch of the bicycles—consists of the following steps:

1) assembly of the components; and 2) dispatch of assembled bicycles.

The system for simulating the production of a bicycle is set up as illustrated in FIG. 1a. Each of the reading modules 200,202,204,206 . . . 220 are serially interconnected by the electrical interconnects 504,506,508 . . . 522. The first reading module 200 in the interconnected series of reading modules is connected to a gateway module 300 by an electrical interconnect 502 and the gateway module 300 is, in turn, connected to a computer 400 by an electrical interconnect 500. A second computer 402 may be connected to the gateway module 300 by an electrical interconnect 524. The various reading modules in this example are all identical and they are releasably interconnected to one another by the interconnects. The reading modules 200–220 are further described in relation to FIGS. 3a and 3b. The gateway module 300 incorporates a LON chip to provide local intelligence. Communication between the reading modules 200–220 along interconnects 504–522 and between the reading module 200 and the gateway module 300 along interconnect 502, is by way of LON Protocol Serial Communications. Communication between the gateway module 300 and the host computer 400 on interconnect 500 is by way of RS 232 Serial Communications.

Each of the reading modules 200–220 represents a process step in one of the process flows a–c. The steps 1), 2) and 3) of process flow a) are represented respectively by reading modules 204, 202 and 200. The steps 1) to 7) of process flow b) are represented respectively by reading modules 206–216. The steps 1) and 2) of process flow c) are represented by reading modules 218 and 220.

Figure 1B:
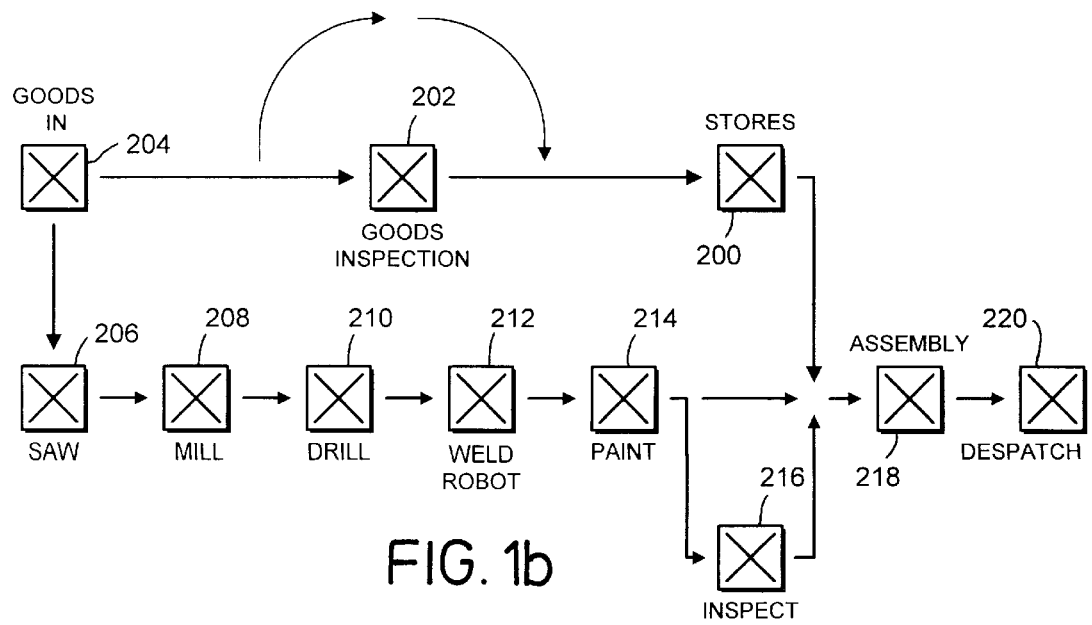
FIG. 1b illustrates the movement of data carriers from reading module to reading module in the system of FIG. 1a, with the arrows indicating direction of movement of components.
Figure 2:
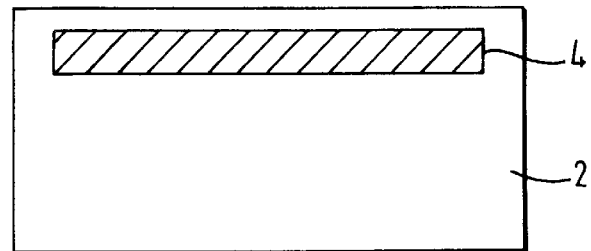
FIG. 2 illustrates a data carrier suitable for use in the system of FIG. 1.

The reading modules can read a unique identification in the form of a number encoded onto a magnetic strip carried by a data carrier in the form of a card as illustrated in FIG. 2. The card 100 has a body 2 preferably made of plastic but which could also be made of any suitable material. The body 2 carries a magnetic strip 4. The magnetic strip 4 is encoded with a unique identification which may be read by any one of the reading modules 200–220 illustrated in FIG. 1. The card identification is an identification number which is recorded onto the magnetic strip before the card is supplied to the customer. There are five distinct colours of cards of the type illustrated in FIG. 2. One red card is used to represent one handlebar in a batch of five handlebars. One orange card represents one of a batch of five saddles. One yellow card represents one chain in a batch of five chains. One green card represents one wheel in a batch of ten wheels. One blue card represents a quantity of steel tubing sufficient to make five bicycles which much be received as an input to the process. To properly simulate the production environment it is intended that the red, orange, yellow and green cards pass through the sequence of reading modules 204,202,200, to simulate the process flow a) and the blue cards pass through the sequence of reading modules 204–216 to simulate the process flow b). The cards then pass through reading module 218 where the five cards representing the components of the bicycle are exchanged for a single card representing the assembled bicycle. This single card passes from reading module 218 through 220 to simulate the process flow c). The direction of movement of the cards through the reading modules is illustrated in FIG. 1b.

The number of red, orange, yellow, green or blue cards there are active in the simulation at any one time will depend upon what and how many bicycle components the user has purchased from suppliers and upon how many bicycles are being produced. The user determines which components are needed to build a bicycle. A Supplier List as illustrated in FIG. 4c describes which supplier produces which components and details how reliable the components are and how much they cost. The user then buys the necessary components by issuing a 'Purchaser Order' to the supplier through the computer. The user then awaits the simulated arrival of the components from the supplier on the computer and continues to manage the production unit simulated by the system with the components which have already arrived. When a new component is delivered from a supplier as indicated by the computer a card representing the component must be entered into the simulation. When a card enters into the simulation it is swiped through the "goods in" reading module 204. The reading module 204 reads the card's unique identification. The computer 400 associates with the card's identification number a number of attributes related to the component the card represents. These attributes are stored in a number of databases in the computer. The attributes comprise fields which do not change during the course of a simulation and fields which vary during the course of a simulation, as will be described later.

Figure 3A:
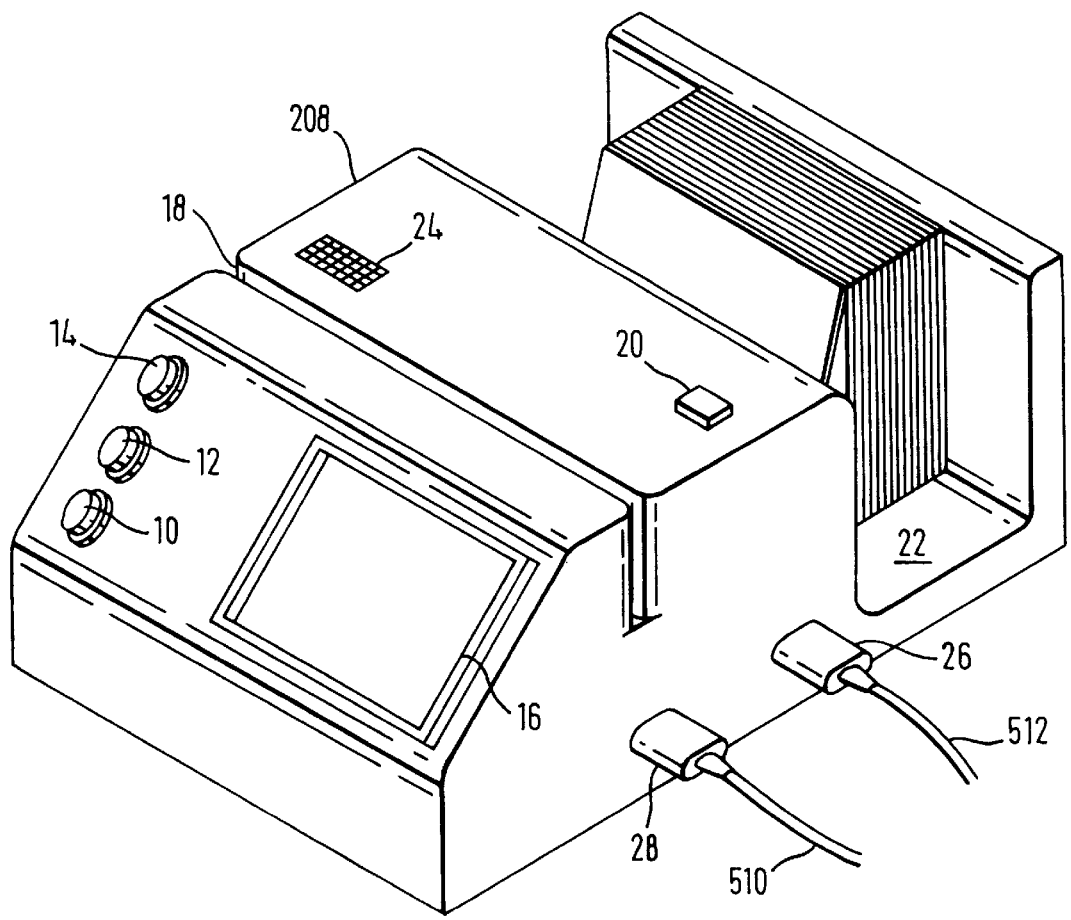
FIG. 3a illustrates a reading module suitable for use in the system of FIG. 1, which can read the data carrier illustrated in FIG. 2.

FIG. 3a illustrates the reading module 208 illustrated in FIGS. 1a and 1b, which is suitable for use in the present embodiment. The reading module has connectors 28 and 26 for receiving respectively interconnects 510 and 512. The interconnects are detachable from the connectors 26 and 28. The reading machine 208 has a groove 18, through which a card may be swiped. Swiping a card 100 through the groove exposes the magnetic strip 4 on the card to card reading circuitry within the module 208. The reading module 208 has three separate indicating lights 10,12 and 14 which indicate the status of the module within the simulation. The "working" light 14 is illuminated to indicate that the reading module is currently engaged in implementing a process step on a component. The "idle" light 12 is illuminated to indicate to a user that the reading module represents a process step that is currently awaiting a component and is intended to prompt the user to supply a component to the process step by swiping an appropriate card through the groove 18. The "failed" light 10 is illuminated to indicate that the reading module represents a process step in the simulation which is unable to be effected because the apparatus for carrying out the process step represented by the reading module 208 is simulating a machine or process which is inoperative. The LCD 16 displays the process step which the reading module represents in the simulation. In this example the reading module 208 represents the process step carried out by the milling machine. The LCD also illustrates how long the milling process will be engaged in processing the components represented by the swiped card (or cards). In this example the milling machine will be actively employed for a total of twelve hours of simulation time. The loudspeaker 24 is used to signal to the user whether a transaction between a reading module and a card is a valid transaction. The reset button 20 is used to reset the reading module 208. The recess 22 in the body of the reading module 208 is used to store cards after they have been involved in a valid transaction with the reading module 208.

Figure 3B:
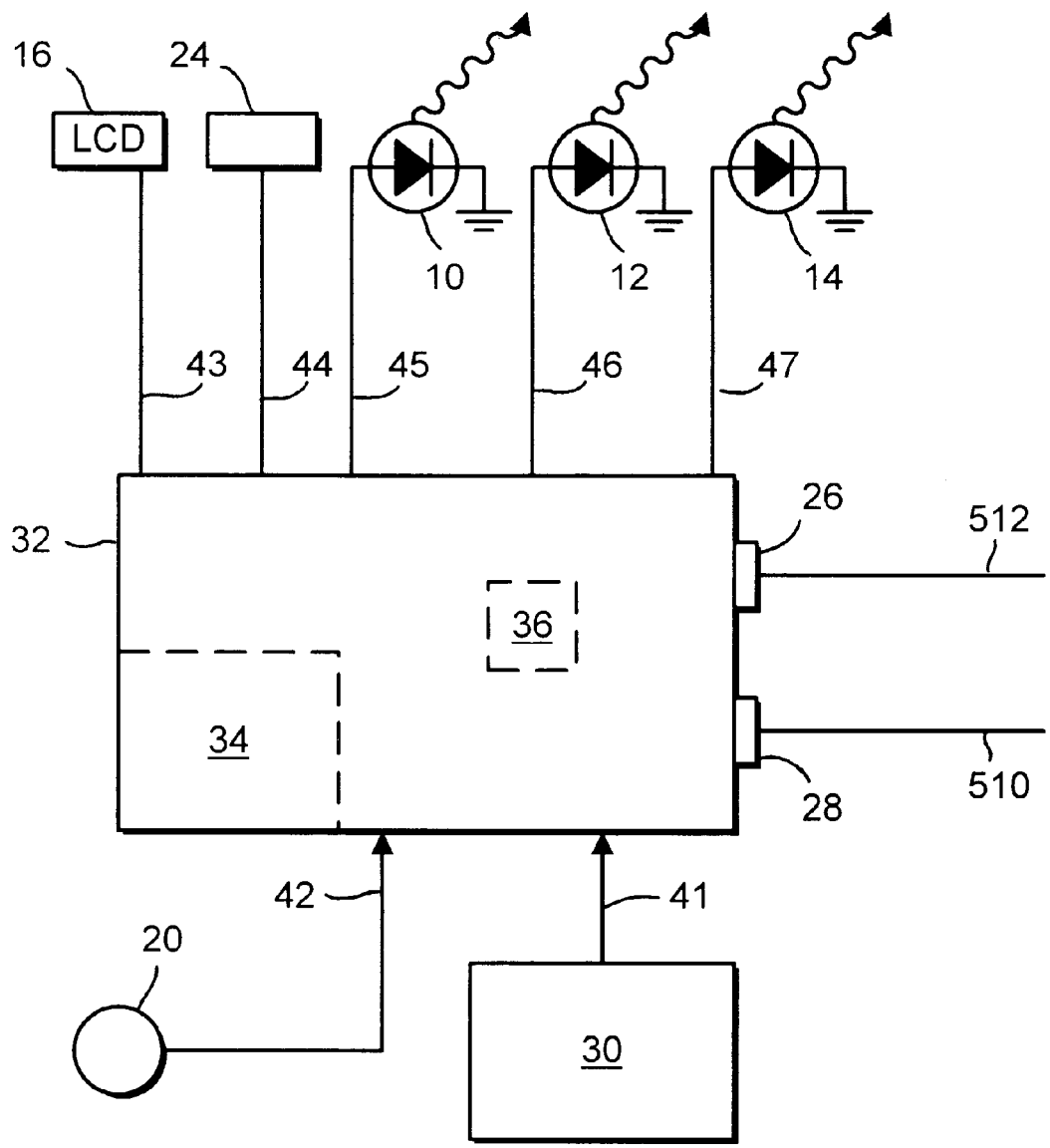

FIG. 3b illustrates a schematic circuit diagram of the reading module 208. The module controller 32 comprises a LON chip and memory 34. The controller 32 is connected to other modules through interconnects 510 and 512 and ultimately through a chain of subsequent modules and interconnects to the host computer. The controller receives an input from card reading circuitry 30 along signal line 41 and an input from reset button 20 along signal line 42. The controller controls the LCD 16, the speaker 24 and the lights 10,12 and 14 through respective signal lines 43,44,45,46 and 47. Reference numeral 36 indicates a clock. This clock is used by the controller 32 during the simulation to determine when a simulated process step has been completed according to the allotted time period in simulated time.

After physically interconnecting the reading modules, the gateway module and the computer as illustrated in FIG. 1a, the data for simulating the production process is stored on the computer. The data is stored as a series of databases. A typical portion of one such database is illustrated in FIG. 4a. This is part of the "Parts List" database which has six distinct input fields: "Identification Number"; "Component"; "Supplier"; "Last Module"; "Status" and "Condition".

The "Identification Number" field receives and stores the identification number of each of the cards 100 which are active in the simulation. Each row in the database in the remaining five fields records specific attributes assigned by the simulation to the particular card 100 which carries the identification number stored in the "Identification Number" field in that row.

The "Component" field records which type of component each of the cards 100 represent in the simulation. In the present case the possible inputs to this field are saddle (S), handlebars (H), chain (C), wheels (W) and tubing (T). The card which represents tubing will travel through the process modules 204–216 to simulate the process flow b). At the end of the process flow the output from the process step represented by reading module 216 is a batch of frames. However, the cards which represent such frames, will still have an entry in the "Parts List" database which records tubing (T) in the "Component" field. The progression of the component through the various steps of the process flow is recorded in the "Last Module" and "Status" fields.

The "Supplier" field records the supplier from whom the component represented by each of the cards 100 was purchased.

The "Identification Number", "Component" and "Supplier" fields receive inputs at the initiation of the simulation. The simulation does not thenceforth vary the inputs to these fields.

The "Last Module" field records for each one of the cards represented by an input in the "Identification Number" field, the reading module with which that card last completed a valid transaction. In the present example each of the reading modules are identified by the reference numeral used in relation to FIG. 1a.

The "Status" field records an input LOCKED or FREE. The FREE input is recorded against a particular identification number when, in the simulation, the process step represented by the module with which the card with that particular identification number last had a valid transaction has finished. The LOCKED input is recorded against a particular identification number when the card with that particular identification number has been subject to a valid transaction with a reading module, and is still, according to simulated time, involved in that process.

The "Condition" field records whether, in the simulation, the component represented by a particular card is substandard. If it is, a FAILED input is recorded in this field against the identification number of the card which represents the sub-standard component.

The "Last Module", "Status" and "Condition" fields are fields whose inputs are varied by the computer in the course of a simulation.

A typical portion of another database is illustrated in FIG. 4b. This is part of the "Job Route for Component T" database, which has three distinct fields: "Module Code"; "Process time"; "Transit time".

The "Module Code" field records the sequence of the process steps in a process flow. Each process step is represented by a reading module. Each reading module is represented by its identifier, which in this example is the reference numeral used to refer to that module in FIG. 1a. The sequence progresses down the page. The sequence of reading modules represented by the illustration in FIG. 4b is the sequence of reading modules which a card having a "component" field entry in the Parts List database of "T" must validly transact with, before that card can represent a finished frame in the simulation. The sequence is a job route for all components of type "T". The computer associates each step in the process with a reading module identifier during set up of the simulation.

The "Process Time" field records the ideal simulation time each of the process steps in the process flow takes to treat the particular component or batch of components subjected to that process.

The "Transmit Time" field records against each of the process steps in the process flow, how long in simulation time it would take for the component treated by the preceding process step to be transferred to that process step.

A job route database exists for each of the component types: handlebars (H), saddle (S), chain (C), wheels (W) and tubing (T).

The production process simulated by the system illustrated in FIG. 1a comprises a number of distinct process flows and each process flow comprises a number of distinct steps. It will now be explained how the whole production process can be simulated.

Each card represents in the simulation a component or batch of components. Each reading module represents in the simulation a process step in a process flow. The swiping of a card through a card reader represents the desire of the user to have the component represented by the card to be treated by the process step represented by the card reader. A valid transaction occurs when the card represents a valid input to the process step represented by the reading module. A transaction could be invalid for a number of reasons. For example, the component could be an unsuitable component for that process, it could be "locked" (involved in another process) or an attempt is being made to present the component to a process step out of the intended sequence. When a card has been subject to a valid transaction with a particular reading module, the card will not be capable of validly transacting with other reading modules for a simulated period. The particular reading module simulates the process step in the process flow that it represents, and on the completion of that simulated process step it updates the databases held on the computer so that the card now represents a component treated according to the process step. The card now becomes FREE and is able to validly transact with another reading module.

The time taken for a reading module to simulate the process step in the process flow it represents, can be varied responsive to strategic or tactical decisions taken by the user.

Figure 5:
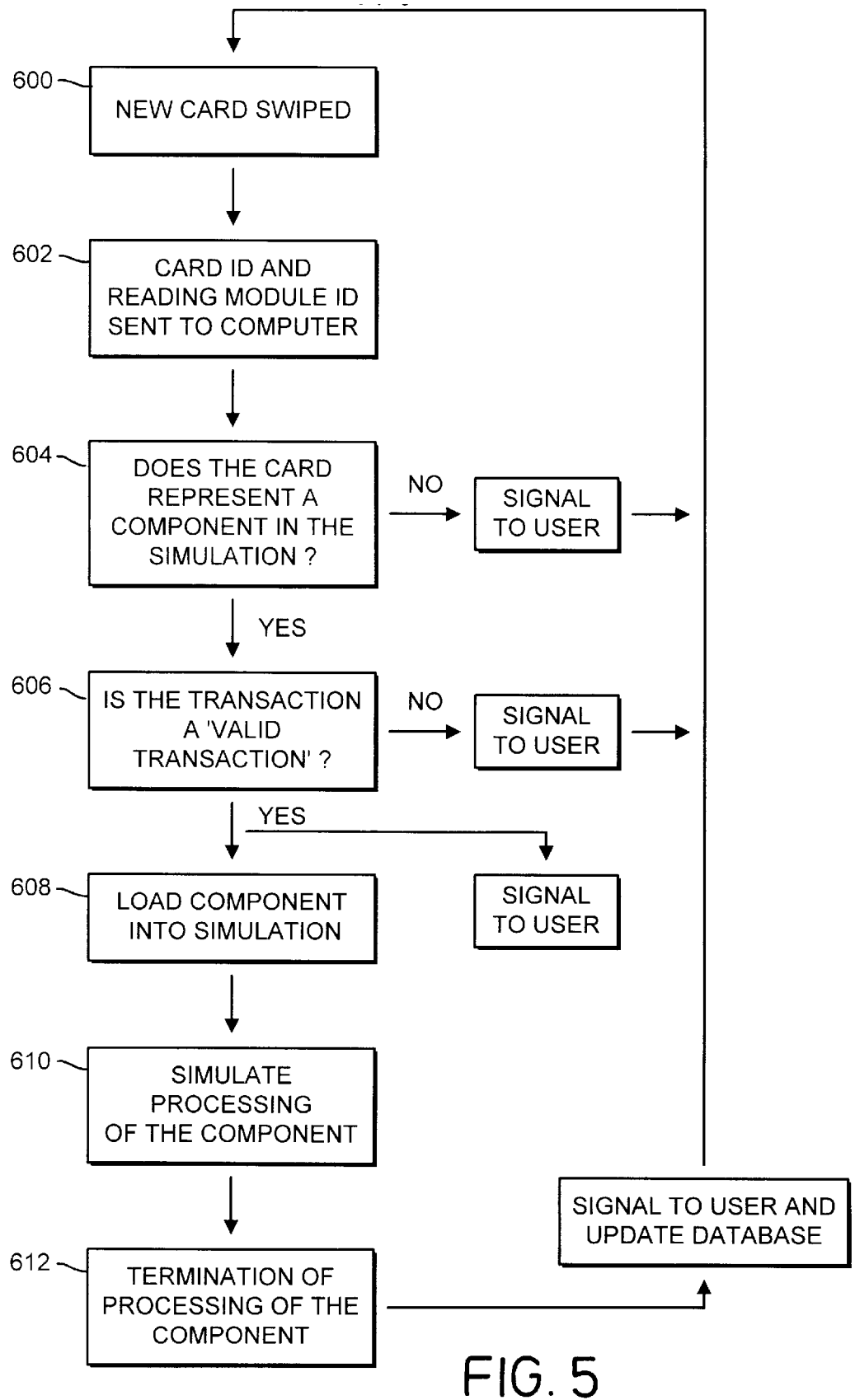
FIG. 5 is a flow chart of the procedural steps in the simulation of a process step in the process simulated by the system illustrated in FIG. 1.

The particulars of the simulation of a process step will now be exemplified with reference to FIG. 5.

When a card 100 is swiped through a reading module 200–220, the reading circuitry 30 of the module reads the identification number recorded on the magnetic strip 4 of the card 100.

The reading module then transmits to the computer 400 a signal along the interconnects 500–522, which includes both the identification number of the card that has been swiped and the identifier of the reading module which has swiped the card.

The computer then determines whether the card represents a component within the simulation. The computer inspects the "Identification Number" field of the "Parts List" database.

If the computer finds an input in this field which corresponds to the read identification number it then determines that the association of the card and the reading module represents a component in the simulation. If the computer does not find an input in the field which corresponds to the read identification number it determines that the card does not represent a component in the simulation. The computer then sends a signal back to the reading module indicating that the card is not part of the simulation. The controller 32 sends a signal along signal line 44 to speaker 24 which emits an audible sound indicating that the card has not been accepted. The reason for the non-acceptance of the transaction may be displayed on a screen of the computer 400 or on the LCD 16 of the reading module. The computer does not proceed further in this instance, and awaits the next transaction.

If the card does represent a component in the simulation, the computer proceeds to determine whether the association of the particular card with the particular module represents a valid transaction. The entries made in respect of the identification number of the card in the Parts List database are inspected. If the "Status" field has an entry LOCKED, the card represents a component which has already been input into a process step and that process step has not yet finished. The card is not therefore valid. The computer sends a signal back to the reading module indicating that the card is not valid. The controller 32 sends a signal along signal line 44 to the speaker 24 which emits an audible sound indicating that the card is invalid. The reason for the invalidity of the card may be displayed on a screen of the computer 400 or on the LCD 16 of the reading module. The computer does not proceed further in this instance and awaits a further transaction.

If the "Status" field has an entry FREE the card is valid and the computer proceeds to determine whether the process step represented by the reading module is a valid process for the component represented by the card. The Parts List database is inspected by the computer and the "Component" field and "Last Module" field are read for the entries corresponding to the identification number of the card 100. We shall assume for the purposes of illustration that the entry in the "Component" field is "T" and the entry in the "Last Module" field is "206". The Job Route database for the component corresponding to the entry in the "Component" field is accessed, in this example the Job Route database for component "T". The "module code" corresponding to the entry in the "Last Module" field is accessed and the subsequent entry in the job route is read. In this example, the entry in the "Last Module" field is "206" and the subsequent entry in the job route is 208 (see FIG. 4b). If the entry read from the job route corresponds to the identifier received from the reading module subsequent to its transaction with the card, then the process step represented by the module is a valid process step. If the entry read from the job route does not correspond to the identifier received from the reading module it signifies that the card has been read through the wrong reading module. If the process step is not valid, the computer sends a signal back to the reading module indicating that the process step is not valid. The controller 32 sends a signal along line 44 to the speaker 24 which emits an audible sound indicating that the process step is invalid. The reason for the invalidity of the process step may be displayed on a screen of the computer 400 or on the LCD 16 of the reading module. The computer does not proceed further in this instance and awaits a further transaction. If the process step is valid then the transaction between the card and the reading module is valid.

Having established that the transaction between the card and reading module is valid, the computer updates the "Parts List" database. The entry in the "Status" field corresponding to the identification number of the swiped card is updated from FREE to LOCKED. The entry on the "Last Module" field corresponding to the identification number of the swiped card is updated to record the identifier of the reading module with which the card has just validly transacted. The computer also sends a signal back to the reading module indicating that the transaction is valid. The controller 32 sends a signal along line 44 to the speaker 24 which emits an audible sound indicating that the transaction is valid. The computer also sends control data to the controller 32 of the reading module. This control data is stored in memory 34 by the controller 32 of the reading module in association with the identification number of the card. The data is used to calculate the total simulated duration of the process step represented by the valid transaction between the card and the reading module.

The reading module simulates the processing of the components represented by cards in the order in which the cards have validly transacted with the reading module. It is possible to swipe a number of cards through a reading module and create a backlog of components input to that reading module in the simulation. The components represented by the cards effectively form a queue, in the simulation, at the input to the process step represented by the reading module. If it is found necessary to change the order in which the components are processed the reading module is reset by depressing the reset button 20. The reset button allows the user to "unload" cards previously loaded onto a process but still awaiting processing. This action causes the controller to instruct the computer to reset the fields in the Parts List database, associated with the cards in the backlog to their pre-swipe condition. The reading module completes the component it is currently working on before changing to its unloaded state.

When it is the turn of one of the components in the queue of the process step to be processed, the control data stored in memory 34 by the controller 32 associated with the identification number of the card which represents that component is retrieved from memory 34 by controller 32. The controller then calculates the simulation time for the processing of this component. A simulation of the processing of the component is initiated—the clock 36 of controller 32 counts down the simulation time and the controller 32 illuminates the light 14 through signal line 47. At the end of the simulation time the controller 32 of the reading module instructs the computer to change the "Status" field in the "Parts List" database associated with the card identification number from LOCKED to FREE. The reading module then loads the next component in its input queue and if there are no components waiting to be received the controller deactivates the light 14 and activates the light 12. The reading module is then in its unloaded state.

The calculation of the total simulated duration of the process step, is, at its simplest, calculated from the information in the job route database for the component. The entries for the "Process Time" field and the "Transit Time" field, for the particular reading module are summed to obtain the standard total simulation time for the processing of that component by the process step represented by the reading module. The controller 32 of the reading module may however vary the standard total time using a resident program, to create an actual total simulation time different from the standard total simulation time.

The variation of the actual total simulation time from the standard total simulation time is calculated on the basis of information stored in the computer. This information may include the operator training level, morale, experience etc or other factors which may effect the speed of execution of a particular process step. This information can in turn be made dependent upon the strategic or tactical decisions made by the user in setting up the simulation, for example the level of pay for the operator or the investment in training. The information required for this calculation is supplied by the computer to the controller of the reading module as part of the control data. This data is stored locally in memory 34. Such data may include an Employee List database as illustrated in FIG. 4d and a Machinery List database as illustrated in FIG. 4e. In particular the resident program will use the information relating to a machine and the machine's operator to calculate if and by how much the actual total simulation time should exceed the standard total simulation time.

The above stages in the simulation of a process step can conveniently be divided into:

a) Ascertaining whether the card represents a component in the simulation.
b) Ascertaining whether the card is valid i.e. whether its status is FREE.
c) Ascertaining whether the reading module represents a process step which is a valid process step for the component represented by the card.
d) Initiation of the simulation, if the card/module transaction is valid, comprising:
   (i) updating "Status" field in Parts List
   (ii) updating "Last Module" field in Parts List
   (iii) providing signals and control data to the module
e) Simulation of the process step by the reading module.
f) Termination of the process step which comprises:
   (i) updating "Status" field in Parts List
   (ii) updating the "Condition" field in Parts List.

The above particular description of these stages in the simulation related to the simulation of a process step which must follow a particular preceding step and in which the number of components received as an input is conserved at the output. The simulation system is however more flexible than this, and can simulate further process steps for example ones which are optional, which receive multiple components as an input and produce a single output and which receive a single component as an input and produce multiple outputs.

The particulars of the simulation of an optional process step will now be exemplified. The simulation proceeds through stages a) to f) above, however there are particular differences in the implementation of stages c) and d). If the process step is optional then the reading module which represents that optional process step will, on transacting with a card, produce an identifier which by default represents a valid process step. The identifier of the reading module representing the optional process step will not appear in the job route of any component. At stage d) (the initiation of the simulation), the updating of the "Last Module" field in the Parts List will not occur. An example of an optional process step in process flow a) is the process step represented by reading module 202 i.e. goods inspection. The inspection step represented by reading module 216, is also optional.

The particulars of the simulation of a process step which receives multiple components and produces a single component will now be exemplified. The operation of the simulation will be explained in relation to the 'assembly' process step represented by reading module 218. The assembly process step receives four distinct types of components from process flow a), namely handlebars represented by a red card, a saddle represented by an orange card, a chain represented by a yellow card and two wheels represented by two green cards. It also receives a frame represented by a blue card from process flow b). In the simulation these components are combined to produce an assembled bicycle which is represented by a mauve card. The mauve card replaces the red, orange, yellow, green and blue cards. The components are combined by swiping all of the five cards representing the components of the bicycle through the reading module. Stages a) to c) of the simulation are carried out for each mauve card. The module now requests a new mauve card. The user swipes this card through the reading module. The five component cards are then removed from the simulation by deleting their entries from the "Parts List" databases. The new card is added to the "Parts List" database. If any of the 5 components had a FAILED condition then the condition of the assembled bicycle which is represented by the mauve card is recorded as FAILED. Stages d), e) and f) of the simulation then continue. It is the entries in the database associated with the new mauve card which are updated. The mauve card then continues through process flow c).

The particulars of a process step which receives a single component and produces multiple components will now be exemplified. In this situation a user swipes a single card through the reading module. Stages a), b) and c) of the simulation are carried out. The reading module will then request the user to swipe multiple cards through the reading module. The database will be amended to update the changes. The entry for the original single component will be removed and entries for the new multiple components will be made.

The simulation system can also simulate the failure of a component or a machine in a process step. A component is failed by changing the "Condition" field for the identification number of the card which represents that component, in the "Parts List" database. The component represented by the card is now considered to be defective by the simulation. However, the failure of the component is only revealed to the user if an inspection process is performed by the user. The inspection process can be implemented either by a separate reading module such as reading module 216 in FIG. 1 or by adding an inspection process and additional simulation time to any one of the process steps in the process. Inspection processes will typically be optional. When an inspection process is performed and the card read by the reading module represents a failed component, the computer sends a signal to the controller 32 of the reading module which causes the speaker 24 to produce an audible signal indicating the component has failed. The fact that the card represents failed components may be displayed on the LCD 16 of the reading module or the screen of the computer 400. The failure of a component is effected by a program resident in the controller 32 of the reading module. The program calculates the probability that the component being processed by the process step represented by the reading module is defective. The calculation is made on the basis of information stored in the computer. This information may include the reliability of the components received from particular suppliers or the likelihood that a process step will malfunction and fail the component. This information can in turn be made dependent upon the strategic or tactical decisions made by the user in setting up the simulation, for example the choice of supplier or the choice of machinery and employee to work the machinery respectively. The information required for this calculation is supplied by the computer to the controller of the reading module as part of the control data. This data is stored locally in the memory 34. Such data may include the Supplier List database illustrated in FIG. 4c, the Machinery List database illustrated in FIG. 4e and the Employee List database illustrated in FIG. 4d. In these examples the program will calculate the likelihood of failure on the basis of the relevant entries in the "Quality Coef" field and "Last Service" field of the Supplier List and Machinery List databases respectively, and on the basis of operator attributes as stored in the Employee List database.

The simulation system can also simulate the failure of a machine in a process step. The failure of a process step in the simulation is effected by a program resident in the controller 32 of the reading module. The program calculates the probability of the process step being interrupted by the failure of a machine within the process step. The calculation is made on the basis of information stored on the computer. This information may include the type of machines employed in the process flow and the skill of the employees operating the machines. This information can be made dependent upon the strategic or tactical decisions made by the user in setting up the simulation, for example the choice of employee, machine type and service schedule. The information required for this calculation is supplied by the computer to the controller of the reading module as part of the control data. Such data may include an Employee List database as illustrated in FIG. 4d and Machinery List database as illustrated in FIG. 4e. The failure of a process step is recorded in the "Condition" field of the Machinery List database. The information is stored locally in the memory 34. The simulated failure of the process step will cause the controller 32 to halt its simulation of the process step. The controller will illuminate light 10 on the reading module associated with the process step and disable lights 14 and 12. The reading module will be disabled and will not appear to transact with cards swiped through it. The reading module can be reinstated into the simulation by performing a simulated service on the machines in the process step. Reinstatement can occur either through the computer or through a "service card" which is swiped through the module. The reinstatement will have some cost to the user within the simulation. On reinstatement of the reading module the light 10 is deactivated and the controller proceeds to simulate the process step which was halted.

Each of the reading modules have a clock for recording the simulation time. The simulation time of each of the reading modules is synchronised at the start of the simulation and each reading module runs its simulation time at the same rate with respect to real time. For example each hour of simulation time may be ten minutes of real time. The relationship between real time and simulated time can be controlled by a user so that simulated time can be slowed down or speeded up or stopped altogether.

A supervisor of the simulation can access the data stored on computer 400 and change the information stored there. In particular the supervisor could change an entry in any of the databases illustrated in FIGS. 4a–4e, and thereby, for example, effect a change in the throughput of a process step in the process or a change in the quality of goods supplied by a supplier. In the system illustrated in FIG. 1 the supervisor accesses the relevant data through computer 402.

Although in the specific example given, each card represents a single component, it would be possible for a single card to represent a batch or set of components. In this connection, a component could represent a quantity of stock or material to be divided into a plurality of smaller components, for example a batch of sheet steel to be cut into individual parts.

Although in the described example a different colour of card is used to represent each type of component, in another embodiment a card with a re-writable text panel is used. The text panel allows the identity of the component represented by the card to be visually discerned. In addition a space is provided for hand written notes to be made to the card using an erasable marker pen. A card writer, connected to the host computer is used to write a text message on the card identifying the component type. The system may be laid out on a base to create a model factory. The base in one embodiment is formed from a white board, that is a board which can be erasably written to. A marker can be used to mark out the physical boundaries of the factory and to make notes on the base. A number of bus bars, or tracks on the white board are used as the interconnects 502 to 522.

The computer provides a menu led instruction for setting up different simulations. The set up procedure includes the identification of the process to be simulated, the identification of the separate process steps in that process, the association of a reading module with each process step by associating the modules identifier with that process step within the host computer, the identification of the components required to perform the simulation, and the creation of the components by using the card writer to visually identify a card as a component in the simulation and by associating the card's identification number with that component in the computer.

While the invention has been particularly shown and described with reference to a preferred embodiment, it will be understood by those skilled in the art that various changes in form and detail may be made therein without departing from the spirit and scope of the invention.

What is claimed is:

1. A system for simulating a manufacturing job route in which a plurality of physical components are subjected to a plurality of physical jobs in order to manufacture physical end products, the system comprising:

a plurality of reading modules interconnected to simulate said manufacturing job route, each of said reading models simulating a different one of said plurality of physical jobs, and each reading module having a unique module code;

a card reader for each of said reading modules;

a plurality of data card s for insertion into said card readers, and each data card representing to a different one of said physical components;

each data card having readable data thereon, said readable data including a unique identification of an associated data card and a unique identification of a physical component that an associated data card represents;

a first fixed data database connected to said reading modules and operating to correlate said unique identification of each of said data cards to a unique identification of the physical component that each of said data cards represents;

a plurality of second fixed data databases connected to said reading modules, one second fixed data database being provided for each of said different physical components;

each of said second fixed data databases operating to correlate each of said module codes to a job time period required to complete a corresponding physical job for an associated one of said physical components; and a variable data database connected to and controlled by said plurality of reading modules;

said variable data database being responsive to a reading of a given data card by a card reader of a given reading module;

said variable data database operating to correlate a last module to read said given data card to a locked status or to a free status of said given data card;

said locked status indicating that said given data card cannot be read by a reading module until a simulated job time period of said last module has expired;

said free status indicating that said given data card can be read by a reading module.

2. The system of claim 1, including:

an invalid indicator for each of said reading modules to indicate an attempt to read a data card having a locked status;

a working indicator for each of said reading modules to indicate that an associated job time period has not expired; and an idle indicator for each of said reading modules to indicate that an associated job time period has expired.

3. The system of claim 2 including:

timer means operable to monitor a plurality of job time periods simulated by said plurality of reading modules.

4. The system of claim 3 wherein each of said reading modules includes:

a failed indicator responsive to a data card being read by a given reading module, and indicating that a physical job that is simulated by said given reading module is a physical job that cannot be completed.

5. The system of claim 4 wherein each of said data carrier is uniquely visually distinguishable, to thereby visually indicate a physical component and/or set of physical components to which a given data carrier corresponds.

6. A method for simulating a manufacturing job route in which a plurality of physical components are subjected to a plurality of physical jobs in order to manufacture physical end products, comprising the steps of:

providing a plurality of reading modules that are interconnected to simulate said manufacturing job route, each of said reading models simulating a different one of said plurality of physical jobs, and each reading module having a unique module code;

providing a card reader for each of said reading modules;

providing a plurality of data cards for insertion into said card readers, each data card individually representing to a different individual one of said physical components;

each data card having readable data thereon, said readable data including a unique identification of an associated data card and a unique identification of a physical component that an associated data card represents;

providing a first fixed data database that is connected to each of said reading modules and that operates to correlate said unique identification of each of said data cards to a unique identification of the physical component that each of said data cards represents;

providing a plurality of second fixed data databases that are connected to each of said reading modules, one second fixed data database being provided for each of said different physical components;

each of said second fixed data databases operating to correlate each of said module codes to a job time period required to complete a corresponding physical job for an associated one of said physical components; and providing a variable data database that is connected to each of said reading modules and that are controlled by each of said plurality of reading modules;

said variable data database being responsive to a reading of a given data card by a card reader of a given reading module;

said variable data database operating to correlate a last module to read said given data card to a locked status or to a free status of said given data card;

said locked status indicating that said given data card cannot be read by a reading module until a simulated job time period of said last module has expired;

said free status indicating that said given data card can be read by a reading module.

7. The method of claim 6, including the steps of:

providing an invalid indicator for each of said reading modules to indicate an attempt to read a data card having a locked status;

providing a working indicator for each of said reading modules to indicate that an associated job time period has not expired; and providing an idle indicator for each of said reading modules to indicate that an associated job time period has expired.

8. The method of claim 7 including the step of:

providing a failed indicator for each of said reading modules responsive to a data card being read by a given reading module, said failed indicator indicating that a physical job that is simulated by said given reading module is a physical job that cannot be completed.

9. The method of claim 8 including the step of:

providing timer means operable to monitor a plurality of job time periods simulated by said plurality of reading modules.

10. The method of claim 9 including the step of:

providing that each of said data cards is uniquely visually distinguishable, to thereby visually indicate a physical component and/or set of physical components to which a given data card corresponds.

11. A method that simulates a manufacturing process having a plurality of job stations that are located along a job route in which a plurality of physical components are subjected to a plurality of physical jobs as physical end products are manufactured, comprising the steps of:

providing a plurality of reading modules that are interconnected to simulate said job route, each of said reading models simulating a different one of said job stations;

each of said reading modules having a job completion time period that is representative of a manufacturing time period that is required by a simulated job station;

providing a card reader for each of said reading modules;

providing a plurality of data cards for insertion into said card readers;

each data card representing one or more physical components of the same type;

each data card having readable data thereon, said readable data including a unique identification of an associated data card and a unique identification of said one or more physical components represented thereby;

providing a first database wherein a job station sequence of each of said data cards is recorded;

providing a second database wherein each of said data cards is recorded as a locked data card or as a free data card;

swiping a given data card into the card reader of a given reading module;

responding to said swiping step and first interrogating said first database to determine that said given reading module simulates a valid job station in a job station sequence of said given data card;

responding to said swiping step and second interrogating said second database to determine that said given data card is recorded as a free data card;

when said first interrogation step determines that said given reading station simulates a valid job station, and when said second interrogation step determines that said given data card is a free data card, accepting said one or more physical components represented by said given data card into said simulation of said manufacturing process, beginning a measurement of said manufacturing time period of said given reading module, and recording in said second database that said given data card is a locked data card; and recording in said second database that said given data card is a free data card when said manufacturing time period of said given reading module has expired.

12. The method of claim 11, including the steps of:

providing an invalid indicator for each of said reading modules to indicate an attempt to read a locked data card;

providing a working indicator for each of said reading modules to indicate that an associated manufacturing time period has not expired; and providing an idle indicator for each of said reading modules to indicate that an associated manufacturing time period has expired.

13. The method of claim 12, including the steps of:

providing a failed indicator for each of said reading modules to indicate that a job station that is simulated by a reading module is a job station that is not operable.

14. The method of claim 13 including the step of:

providing timer mean s operable to monitor said manufacturing time periods simulated by said plurality of reading modules.

15. The method of claim 14 including the step of:

providing that each of said data cards is uniquely visually distinguishable, to thereby visually identify a physical component that each data card represents.

* * * * *